US011518950B2

(12) United States Patent
McDuff

(10) Patent No.: US 11,518,950 B2
(45) Date of Patent: *Dec. 6, 2022

(54) BIODIESEL FUEL MIXTURES

(71) Applicant: HULL PARTNERS, LLC, Hull, MA (US)

(72) Inventor: Patrick McDuff, Hull, MA (US)

(73) Assignee: HULL PARTNERS, LLC, Hull, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,836

(22) Filed: Oct. 26, 2021

(65) Prior Publication Data

US 2022/0049173 A1    Feb. 17, 2022

Related U.S. Application Data

(63) Continuation of application No. 15/653,213, filed on Jul. 18, 2017, now Pat. No. 11,186,789.

(51) Int. Cl.
| | | |
|---|---|---|
| *C10L 1/02* | (2006.01) | |
| *C10L 1/22* | (2006.01) | |
| *C10L 1/18* | (2006.01) | |
| *C10L 10/02* | (2006.01) | |
| *C10L 1/23* | (2006.01) | |

(52) U.S. Cl.
CPC ............... *C10L 1/026* (2013.01); *C10L 1/18* (2013.01); *C10L 1/22* (2013.01); *C10L 10/02* (2013.01); *C10L 1/1811* (2013.01); *C10L 1/231* (2013.01); *C10L 2200/0446* (2013.01); *C10L 2200/0476* (2013.01); *C10L 2270/026* (2013.01)

(58) Field of Classification Search
CPC ............ C10L 10/02; C10L 1/026; C10L 1/18; C10L 1/1811; C10L 1/22; C10L 1/231; C10L 2200/0446; C10L 2200/0476; C10L 2270/026; Y02E 50/10
See application file for complete search history.

(56) References Cited

U.S. PATENT DOCUMENTS

| | | | |
|---|---|---|---|
| 6,461,497 B1 | 10/2002 | Pedersen | |
| 2005/0160663 A1 | 7/2005 | Valentine | |
| 2005/0210739 A1 | 9/2005 | Esen et al. | |
| 2007/0113467 A1 | 5/2007 | Abou-Nemeh | |
| 2008/0163542 A1* | 7/2008 | Krupa | C10L 1/02 44/308 |
| 2010/0154733 A1 | 6/2010 | Brewer | |
| 2011/0023351 A1 | 2/2011 | Poirier et al. | |
| 2011/0138679 A1 | 6/2011 | Wells et al. | |

(Continued)

OTHER PUBLICATIONS

"Comments of Growth Energy on the Air Resources Board Staff Presentations at a Public Consultation Meeting on Regulations for Commercialization of Alternative Diesel Fuels," Growth Energy (2014) [https://www.arb.ca.gov/fuels/diesel/altdiesel/meetings/20141205growthenergyinput.pdf <https://protect-us.mimecast.com/s/PLhWC9rp8WUBrpNCoVubP?domain=arb.ca.gov>].

(Continued)

*Primary Examiner* — Latosha Hines
(74) *Attorney, Agent, or Firm* — Lando & Anastasi, LLP

(57) ABSTRACT

Provided herein are biodiesel fuel mixtures having improved properties for reducing NOx emissions as well as total particular matter emissions, CO emissions, and total hydrocarbon emissions.

19 Claims, 9 Drawing Sheets

(56) References Cited

U.S. PATENT DOCUMENTS

2012/0285078 A1\* 11/2012 Yeh .................. C10L 1/026
44/388
2019/0024001 A1 1/2019 McDuff

OTHER PUBLICATIONS

"Standard Specification for Biodiesel Fuel Blend Stock (B100) for Middle Distillate Fuels," ASTM International, Designation: D 6751-09 (Oct. 2009), 11 pages.
"Standard Specification for Diesel Fuel Oil, Biodiesel Blend (B6 to B20)," ASTM International, Designation: D7467-13 (Jun. 2013), 19 pages.
"Standard Specification for Diesel Fuel Oils," ASTM International, Designation: D975 ? 12a (2012), 25 pages.
Crawford, "NOx Emission Impact of Soy- and Animal-based Biodiesel Fuels: A Re-Analysis," Dec. 10, 2013.
Balaji et al., "Experimental reduction of NOx and HC emissions in a CI engine fuelled with methyl ester of neem oil using p-phenylenediamine antioxidant." Journal of Scientific & Industrial Research. 73: 177-80 (2014).
Chapman et al., "Eliminating the NOx Emissions Increase Associated with Biodiesel." Prepr Pap—Am Chem Soc., Div Fuel Chem. 48(2) 639-40 (2003).
Chevron "Diesel Fuels Technical Review" 2007 (Year: 2007).
Clothier et al., "How do diesel-fuel ignition improvers work?" Chem Soc Reviews. 22: 27 pages (1993).
Durbin et al. (Jul. 2013) "Final Report: CARB B20 biodiesel preliminary and certification testing." University of California, CE-CERT. Riverside, CA. (47 pages).
Durbin et al. (Oct. 2011) Final Report: CARB assessment of the emissions from the use of biodiesel as a motor vehicle fuel in California. "Biodiesel characterization and NOX mitigation study." University of California, CE-CERT. Riverside, CA. (345 pages).
Kesling et al. (1994) The Thermal Stability of a Peroxide-Based Cetane Improvement Additive. Detroit, Michigan:The Engineering Society for Advancing Mobility (12 pages).
McCormick, et al. (2003). NOx Solutions for Biodiesel: Final Report (Report No. NREUSR-510-31465). Golden, Colorado: National Renewable Energy Laboratory (49 pages).
Schwab et al. (1999). The Effects of 2-Ethylhexyl Nitrate and Di-tertiary-butyl Peroxide on the Exhaust Emissions from a Heavy-Duty Diesel Engine. Dearborn, Michigan: SAE International Techinical Paper Series. International Spring Fuels & Lubricants Meeting & Exposition (12 pages).
Szybist et al. (2003). Potential Methods for NOx Reduction from Biodiesel. Pittsburgh, Pennsylvania: SAE InternationalTechnical Paper Series. Powertrain & Fluid Systems Conference & Exhibition (9 pages).
Ullman et al. (1990) Effects of Fuel Aromatics, Cetane Number, and Cetane Improver on Emissions from a 1991 Prototype Heavy-Duty Diesel Engine. Tulsa, Oklahoma: SAE Techinical Paper Series (20 pages).
United States Environmental Protection Agency. (2003). The Effect of Cetane Number Increase Due to Additives on NOx Emissions from Heavy-Duty Highway Engines: Final Technical Report (Report No. EPA420-R-03-002) 42 pages.
United States Environmental Protection Agency. (2004). Guidance on Quantifying NOx Benefits for Cetane Improvement Programs for Use in SIPs and Transportation Conformity. (Report No. EPA420-B-04-005) 32 pages.
Varatharajan et al. "Effect of aromatic amine antioxidants on NOx emissions from a soybean biodiesel powered DI diesel engine." Fuel Processing Technology. 106: 526-32 (2013).

\* cited by examiner

BIODIESEL FUEL MIXTURES

CROSS-REFERENCE TO RELATED APPLICATIONS

This application claims priority under 35 U.S.C. § 120 as a continuation of U.S. patent application Ser. No. 15/653,213, titled BIODIESEL FUEL MIXTURES, filed Jul. 18, 2017, which is incorporated herein in its entirety for all purposes.

BACKGROUND

Biodiesel, an alternative diesel fuel created from the esterification of fats and fatty acids, continues to gain significant interest as a renewable energy source. The biodiesel market is expected to reach 6,453 million liters in the U.S. by 2020 and 45,291 million liters globally. See Global-Data, Global Biodiesel Market Analysis and Forecasts to 2020, Accessed May 26, 2012 and Fuel Processing Technology 106 (2013) 526-532. Biodiesel is an attractive alternative fuel source worldwide because it operates in conventional engines, does not require special storage, has less odor offensive exhaust, and has a higher flash point, thereby making it a safer energy source than conventional diesel fuel.

Despite these advantages, a major impediment to the wide-spread committed use of biodiesel has been the observed increase in $NO_x$ emissions. For example, for 100% biodiesel, $NO_x$ emissions can increase by 13% or more. See Ener Conver and Manag, 50, (2009), 14-34. Excessive NOx emission causes smog, ground level ozone, and acid rain. See Journal of Scientific & Industrial Industry Research, Vol. 73, March 2014, 177-180. This is a significant drawback, particularly since governmental agencies continue to impose new legislation on "cleaner air" and mandate higher emission standards for motor vehicles. Thus, a rising concern is that biodiesel may not be able to meet these heightened requirements.

The need therefore remains for biodiesel fuels which do not negatively impact $NO_x$ emission, as well as other criteria pollutants such as particulate matter, total hydrocarbons and carbon monoxide.

SUMMARY

Provided herein are biodiesel fuel mixtures comprising a first biodiesel fuel, a second biodiesel fuel, a base petroleum diesel fuel, and an additive. The disclosed biodiesel fuel mixtures comprise a cetane number of 45 to 70 and have no negative impact on $NO_x$ emissions. Indeed, the disclosed mixtures decrease $NO_x$ emission by 1 to 7%. See e.g., Table 12. The disclosed mixtures also decrease total particular matter emissions, CO emissions, and total hydrocarbon emissions. See e.g., Table 12.

Process for manufacturing the disclosed biodiesel fuel mixtures are also provided.

DETAILED DESCRIPTION

Figure 1:
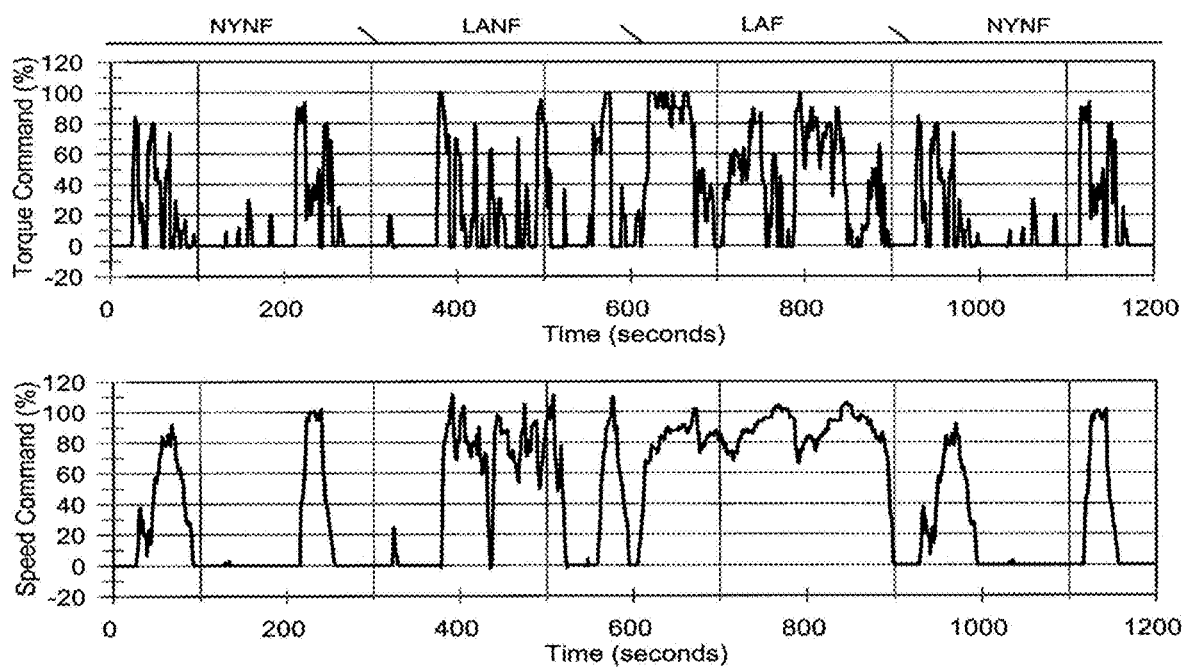
FIG. 1 is a graphic representation of torque and speed commands for the transient cycle for heavy-duty engines.

In a first embodiment, provided herein are biodiesel fuel mixtures comprising a first biodiesel fuel, a second biodiesel fuel, a base petroleum diesel fuel, and an additive, wherein the biodiesel fuel mixture has a cetane number of 45 to 70.

In a second embodiment, provided herein are biodiesel fuel mixtures comprising 12-15 wt. % of a first biodiesel fuel, 6-8 wt. % of a second biodiesel fuel, 79-81 wt. % of a base petroleum diesel fuel, and an additive, wherein the biodiesel fuel mixture has a cetane number of 45 to 70.

In a third embodiment, provided herein are biodiesel fuel mixtures comprising 13 wt. % of a first biodiesel fuel, 7 wt. % of a second biodiesel fuel, 80 wt. % of a base petroleum diesel fuel, and from 100 to 3500 ppm of an additive, wherein the biodiesel fuel mixture has a cetane number of 45 to 70.

1. Definitions

The term "biodiesel" means a fuel derived from vegetable oils or animal fats. Biodiesel includes fuels comprising mono-alkyl esters of long-chain fatty acids derived from the transesterification of fats obtained from vegetable oils or other fatty acids such as animal fats or waste cooking oils as well as fuel resulting from hydrotreating vegetable oils, animal fats or mono-alkyl esters of long-chain fatty acids. In one aspect, the biodiesel used herein comprises fatty acid methyl esters (FAMEs) derived from the transesterification of vegetable oil with methanol.

"Petroleum diesel fuel" and "base petroleum diesel fuel" are used interchangeably and refer to a combustible petroleum distillate used as fuel for diesel engines. Petroleum diesel fuel is typically formed from the fractional distillation of crude oil between 200° C. and 350° C. at atmospheric pressure, resulting in a mixture of carbon chains comprising between 8 and 21 carbon atoms per molecule.

The term "no negative impact" as in, wherein the mixture has no negative impact on $NO_x$ emissions, means that there is no statistically significant increase in the amount of $NO_x$ emission using the disclosed biodiesel fuel mixture when compared to petroleum diesel fuel in the same engine. Statistical significance is based from the known one-sided Student's t-statistics as set for in Snedecor and Cochran, *Statistical Methods* ($7^{th}$ edition). Pg 91, Iowa State University Press, 1980, e.g., a cut-off value of 0.5 or less.

2. Fuel Mixtures

In a fourth embodiment, the biodiesel fuel mixtures described herein have a cetane number of 45 to 65, wherein the remaining features are as described above in the first, second, or third embodiment. Alternatively, the biodiesel fuel mixtures described herein have a cetane number of 45 to 60, 45 to 55, 55 to 65, 50 to 60, 48 to 51, or 58 to 60, wherein the remaining features are as described above in the first, second, or third embodiment.

In a fifth embodiment, the biodiesel fuel mixtures described herein comprise 25% or less of aromatics by volume, wherein the remaining features are as described above in the first, second, third, or fourth embodiment. Alternatively, the biodiesel fuel mixture described herein comprise 20% or less of aromatics by volume, 15% or less of aromatics by volume, 12% or less of aromatics by volume, 10% or less of aromatics by volume, or 20% to 25% aromatics by volume, wherein the remaining features are as described above in the first, second, third, or fourth embodiment.

In a sixth embodiment, the biodiesel fuel mixtures described herein comprise less than 7% polycyclic aromatics by weight, wherein the remaining features are as described above in the first, second, third, fourth, or fifth embodiment. Alternatively, the biodiesel fuel mixtures described herein comprise less than 5% polycyclic aromatics by weight or 4.5% to 5.5% polycyclic aromatics by weight, wherein the remaining features are as described above in the first, second, third, fourth, or fifth embodiment.

In a seventh embodiment, the weight ratio of total aromatics to polycyclic aromatics in the biodiesel fuel mixtures described herein is 5:1, wherein the remaining features are as described above in the first, second, third, fourth, fifth, or sixth embodiment. Alternatively, the weight ratio of total aromatics to polycyclic aromatics in the biodiesel fuel mixtures described herein is 4:1, 3:1, or 2:1, wherein the remaining features are as described above in the first, second, third, fourth, fifth, or sixth embodiment.

In an eighth embodiment, the sulfur content in the biodiesel fuel mixtures described herein is less than 15 ppm, wherein the remaining features are as described above in the first, second, third, fourth, fifth, sixth, or seventh embodiment. Alternatively, the sulfur content in the biodiesel fuel mixtures described herein is less than 10 ppm, less than 5 ppm, less than 1.0 ppm, wherein the remaining features are as described above in the first, second, third, fourth, fifth, sixth, or seventh embodiment.

In a ninth embodiment, the nitrogen content in the biodiesel fuel mixtures described herein is from 0 to about 800 ppm, wherein the remaining features are as described above in the first, second, third, fourth, fifth, sixth, seventh, or eighth embodiment. 200 ppm or higher, wherein the remaining features are as described above in the first, second, third, fourth, fifth, sixth, seventh, or eighth embodiment. Alternatively, the nitrogen content in the biodiesel fuel mixtures described herein is from 50 ppm to about 600 ppm, from about 100 to about 400 ppm, from about 200 to about 800 ppm, from about 10 to about 600 ppm, and from about 250 to about 300 ppm, wherein the remaining features are as described above in the first, second, third, fourth, fifth, sixth, seventh, or eighth embodiment.

In a tenth embodiment, the fatty acid methyl ester content in the biodiesel fuel mixtures described herein is 15 to 25% or 19 to 21%, wherein the remaining features are as described above in the first, second, third, fourth, fifth, sixth, seventh, eighth, or ninth embodiment.

In an eleventh embodiment, the viscosity at 40° C. in the biodiesel fuel mixtures described herein is 1.9 to 4.1 centistokes, wherein the remaining features are as described above in the first, second, third, fourth, fifth, sixth, seventh, eighth, ninth, or tenth embodiment.

In a twelfth embodiment, the additive in the biodiesel fuel mixtures described herein is present in an amount of 500, 1000, 1500, 2000, 2500, 3000, 3300, 4000, 5000, 6000, 7000, 8000, 9000 or 10,000 ppm, wherein the remaining features are as described above in the first, second, third, fourth, fifth, sixth, seventh, eighth, ninth, tenth, or eleventh embodiment. Alternatively, the additive is present in an amount of 3300 ppm or 3000 ppm, wherein the remaining features are as described above in the first, second, third, fourth, fifth, sixth, seventh, eighth, ninth, tenth, or eleventh embodiment.

In a thirteenth embodiment, the additive in the biodiesel fuel mixtures described herein is selected from an amine-based antioxidant, a phenol-based antioxidant, or a nitrated alkyl-based antioxidant, wherein the remaining features are as described above in the first, second, third, fourth, fifth, sixth, seventh, eighth, ninth, tenth, eleventh, or twelfth embodiment. Alternatively, the additive is selected from 2-ethylhexyl nitrate (2-EHN); di-tert-butyl peroxide (DTBP); tertiary butylhydroquinone (TBHQ); N,N-di-sec-butyl-1,4-phenylenediamine (DTBP), N,N'-diphenyl-1,4-phenylenediamine (DPPD); and N-phenyl-1,4-phenylenediamine (NPPD), wherein the remaining features are as described above in the first, second, third, fourth, fifth, sixth, seventh, eighth, ninth, tenth, eleventh, or twelfth embodiment. In another alternative, the additive is 2-ethylhexyl nitrate, wherein the remaining features are as described above in the first, second, third, fourth, fifth, sixth, seventh, eighth, ninth, tenth, eleventh, or twelfth embodiment.

In a fourteenth embodiment, the biodiesel fuel mixtures described herein have no negative impact on $NO_x$ emissions, wherein the remaining features are as described above in the first, second, third, fourth, fifth, sixth, seventh, eighth, ninth, tenth, eleventh, twelfth, or thirteenth embodiment.

In a fifteenth embodiment, the biodiesel fuel mixtures described herein decrease $NO_x$ emissions of an engine by 1 to 7%, wherein the remaining features are as described above in the first, second, third, fourth, fifth, sixth, seventh, eighth, ninth, tenth, eleventh, twelfth, thirteenth, or fourteenth embodiment. Alternatively, the biodiesel fuel mixtures described herein decrease $NO_x$ emissions of an engine by 2 to 7%; by 3 to 7%; or by 5 to 7%, wherein the remaining features are as described above in the first, second, third, fourth, fifth, sixth, seventh, eighth, ninth, tenth, eleventh, twelfth, thirteenth, or fourteenth embodiment. In one alternative, the biodiesel fuel mixtures described herein comprise NOx emissions equivalent to those of a reference fuel having the following specifications: sulfur (15 ppm maximum), aromatics (10 vol % maximum), polycyclic aromatics (10 wt % maximum), nitrogen (10 ppm maximum), unadditized cetane number (48 minimum), API gravity (33-39), flash point (130° F. minimum), viscosity @ 40° C., cSt (2.0-4.12), IBP (340 to 420° F.), 10% (400 to 490° F.), 50% (470 to 560° F.), 90% (550 to 610° F.), and EP (580 to 660° F.).

In a sixteenth embodiment, the biodiesel fuel mixtures described herein decrease total particular matter emissions of an engine by 20 to 25%, wherein the remaining features are as described above in the first, second, third, fourth, fifth, sixth, seventh, eighth, ninth, tenth, eleventh, twelfth, thirteenth, fourteenth, or fifteenth embodiment.

In a seventeenth embodiment, the biodiesel fuel mixtures described herein decrease CO emissions of an engine by 15 to 25%, wherein the remaining features are as described above in the first, second, third, fourth, fifth, sixth, seventh, eighth, ninth, tenth, eleventh, twelfth, thirteenth, fourteenth, fifteenth, or sixteenth embodiment.

In an eighteenth embodiment, the biodiesel fuel mixtures described herein decrease total hydrocarbon emissions of an engine by 15 to 25%, wherein the remaining features are as described above in the first, second, third, fourth, fifth, sixth, seventh, eighth, ninth, tenth, eleventh, twelfth, thirteenth, fourteenth, fifteenth, sixteenth, or seventeenth embodiment.

In a nineteenth embodiment, the engine used to test the properties of the biodiesel fuel mixtures described herein is a diesel engine such as a Detroit Diesel Corporation Series 60 heavy duty diesel engine or a Cummins ISM 370 diesel engine.

In a twentieth embodiment, the biodiesel fuel mixtures, and accompanying properties and features are as described below in the exemplification section.

EXEMPLIFICATION

The following starting fuels and additives were blended at various concentrations. Table 1 provides codes for the six additives and Table 2 lists the fuel codes corresponding to each fuel blend and the concentrations.

TABLE 1

| Additive Code | Component % | | |
|---|---|---|---|
| | 2-EHN | DTBP | PDA |
| A1, A7 | 100 | 0 | 0 |
| A2 | 91 | 0 | 9 |
| A3 | 91 | 9 | 0 |
| A4 | 0 | 100 | 0 |
| A5 | 82 | 9 | 9 |
| A6 | 0 | 0 | 100 |

TABLE 2

| Fuel Code | Concentration, %[a] | | | |
|---|---|---|---|---|
| | Base Fuel | Biodiesel 1 | Biodiesel 2 | Biodiesel 3 | Additive/Conc. |
| F1 | — | 100 | — | — | — |
| F2 | — | — | 100 | — | — |
| F3 | — | — | — | 100 | — |
| F4 | 100 | — | — | — | — |
| F5 | 80 | 13 | 7 | — | — |
| F6 | 80 | — | — | 20 | — |
| F7 | 80 | — | — | 20 | 3000 |
| F8 | 80 | 13 | 7 | — | 3000 |
| F9 | 80 | 13 | 7 | — | 1000 |
| F10 | 80 | 13 | 7 | — | 2000 |
| F11 | 80 | 13 | 7 | — | 1500 |
| F12 | 80 | 13 | 7 | — | 3300[b] |
| F13 | 80 | 13 | 7 | — | 3300[c] |
| F14 | 80 | 13 | 7 | — | 2500 |

[a]Concentrations for fuel in percentage, concentration for additive in ppm, additive A1 1000 unless indicated
[b]Additive A3
[c]Additive A2

Fuel blends were tested using procedures similar to the one outlined in Title 13 California Code of Regulations Section 2882 "Aromatic Hydrocarbon Content of Diesel Fuel." The actual screening plan is shown in Table 3. For screening, Alternative 3 was the Title 13 protocol selected. For the first two days of testing, duplicate tests with only a single "prep" were used to quickly move through a large number of fuels. After the first day of testing, the B100 blend with F1 (35 percent) and F2 (65 percent) was selected as the B100 for all subsequent testing. On the final two days of testing, the Alternative 3 procedure was followed to screen a 3000 ppm and 2000 ppm additive, respectively. The test results are reported below in Table 3.

The heavy-duty EPA transient cycle is described by means of percent of maximum torque and percent of rated speed for each one-second interval over a test cycle of 1199 seconds duration. To generate a transient cycle, an engine's full power curve is obtained from an engine speed below curb idle speed to maximum no-load engine speed. Data from this "power curve," or engine map, are used with the specified speed and load percentages to form a transient cycle. A graphic presentation of the speed and torque commands which constitute a transient cycle is given in FIG. 1 for illustration purposes.

In general, a transient test consists of a cold-start transient cycle and a hot-start transient cycle. The same engine command cycle is used in both cases. For the cold-start, the diesel engine was operated over a "prep" cycle, and then allowed to stand overnight in an ambient soak at a temperature between 68° F. and 86° F. The cold-start transient cycle begins when the engine is cranked for cold start-up. Upon completion of the cold-start transient cycle, the engine is stopped and allowed to stand for 20 minutes. After this hot-soak period, a hot-start cycle begins with engine cranking. In order to determine how well the engine follows the transient command cycle, engine performance was compared to engine command, and several statistics were computed. These computed statistics must be within tolerances specified in the CFR. In addition to statistical parameters, the cycle work actually produced should be between 5 percent above and 15 percent below the work requested by the command cycle. Emissions measurements included total hydrocarbon (THC), carbon monoxide (CO), oxides of nitrogen (NO), carbon dioxide ($CO_2$), and total particulate matter (PM).

TABLE 3

| Step | Description |
|---|---|
| 1 | Install engine. Perform emission instrument calibrations as required. Calibrate torquemeter and check signal conditioning systems. Validate CVS gaseous and particulate sampling systems using propane recovery techniques |
| 2 | Change oil and filters. Operate engine for 5 hours with CARB equivalent fuel to break-in the oil, Check engine condition using in-house, low sulfur emissions type fuel, and note fault codes if any. Bring engine oil level to "full". |
| 3 | Perform fuel change procedure to operate on Fuel R (F4). Change filter, purge fuel supply, etc. |
| 4 | Warm up engine, and operate at rated speed and load, then check performance. |
| 5 | Conduct transient "full-throttle" torque map from low- to high-idle. Compute and store resulting transient command cycle. |
| 6 | Run a 20-minute practice or conditioning transient cycle, and adjust dynamometer controls to meet statistical limits for transient cycle operation. |
| 7 | Soak the engine for 20-minutes. Run three hot-start transient tests with a 20-minute soak between each. For each individual hot-start test, determine THC, CO, $NO_x$, $CO_2$, and PM. |
| 8 | Change fuel to F5. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 9 | Change fuel to F6. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 10 | Change fuel to F7. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 11 | Change fuel to F8. Repeat Steps 6 and 7. Soak the engine for 20-minutes. Run two hot-start transient tests with a 20-minute soak between each. For each individual hot-start test, determine THC, CO, $NO_x$, $CO_2$, and PM. |

TABLE 3-continued

| Step | Description |
|---|---|
| 12 | Change fuel to F9. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 13 | Change fuel to F10. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 14 | Change fuel to F11. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 15 | Change fuel to F4. Repeat Steps 6 and 7. Soak the engine for 20-minutes. Run two hot-start transient tests with a 20-minute soak between each. For each individual hot-start test, determine THC, CO, $NO_x$, $CO_2$, and PM. |
| 16 | Change fuel to F8. Repeat Steps 6 and 7 except that the fuel filters should be dumped, and the engine should be run for 20 minutes at rated speed and load prior to Step 7. Soak the engine for 20-minutes. Run two hot-start transient tests with a 20-minute soak between each. For each individual hot-start test, determine THC, CO, $NO_x$, $CO_2$, and PM. |
| 17 | Change fuel to F13. Repeat Steps 6 and 7 except that the fuel filters should be dumped, and the engine should be run for 20 minutes at rated speed and load prior to Step 7. Soak the engine for 20-minutes. Run two hot-start transient tests with a 20-minute soak between each. For each individual hot-start test, determine THC, CO, $NO_x$, $CO_2$, and PM. |
| 18 | Change fuel to F12. Repeat Steps 6 and 7 except that the fuel filters should be dumped, and the engine should be run for 20 minutes at rated speed and load prior to Step 7. Soak the engine for 20-minutes. Run two hot-start transient tests with a 20-minute soak between each. For each individual hot-start test, determine THC, CO, $NO_x$, $CO_2$, and PM. |
| 19 | Change fuel to F5. Repeat Steps 6 and 7 except that the fuel filters should be dumped, and the engine should be run for 20 minutes at rated speed and load prior to Step 7. Soak the engine for 20-minutes. Run two hot-start transient tests with a 20-minute soak between each. For each individual hot-start test, determine THC, CO, $NO_x$, $CO_2$, and PM. |
| 20 | Change fuel to F14. Repeat Steps 6 and 7 except that the fuel filters should be dumped, and the engine should be run for 20 minutes at rated speed and load prior to Step 7. Soak the engine for 20-minutes. Run two hot-start transient tests with a 20-minute soak between each. For each individual hot-start test, determine THC, CO, $NO_x$, $CO_2$, and PM. |
| 21 | Change fuel to F4. Repeat Steps 4 through 8. |
| 22 | Change fuel to F8. Repeat Steps 4 through 8. |
| 23 | Change fuel to F4. Repeat Steps 4 through 8. |
| 24 | Change fuel to F10. Repeat Steps 4 through 8. |

For this screening work, a 1991 DDC Series 60 heavy-duty diesel engine was mounted in a transient-capable test cell. This engine had an inline, six cylinder configuration rated for 365 hp at 1800 rpm. It was turbocharged and used a laboratory water-to-air heat exchanger for a charge air intercooler. Table 4 lists the engine specifications and features.

TABLE 4

| Engine Parameter | Comment |
|---|---|
| Make | Detroit Diesel |
| Model | Series 60, 6067GU60 |
| Engine Displacement and Configuration | 12.7 L, I-6 |
| Emission Family | MDD12.7FZAK |
| Rated Power | 365 bhp at 1800 rmp |
| Electronic Control Module | DDEC-II |
| Aspiration | Turbocharged |

Figure 2:
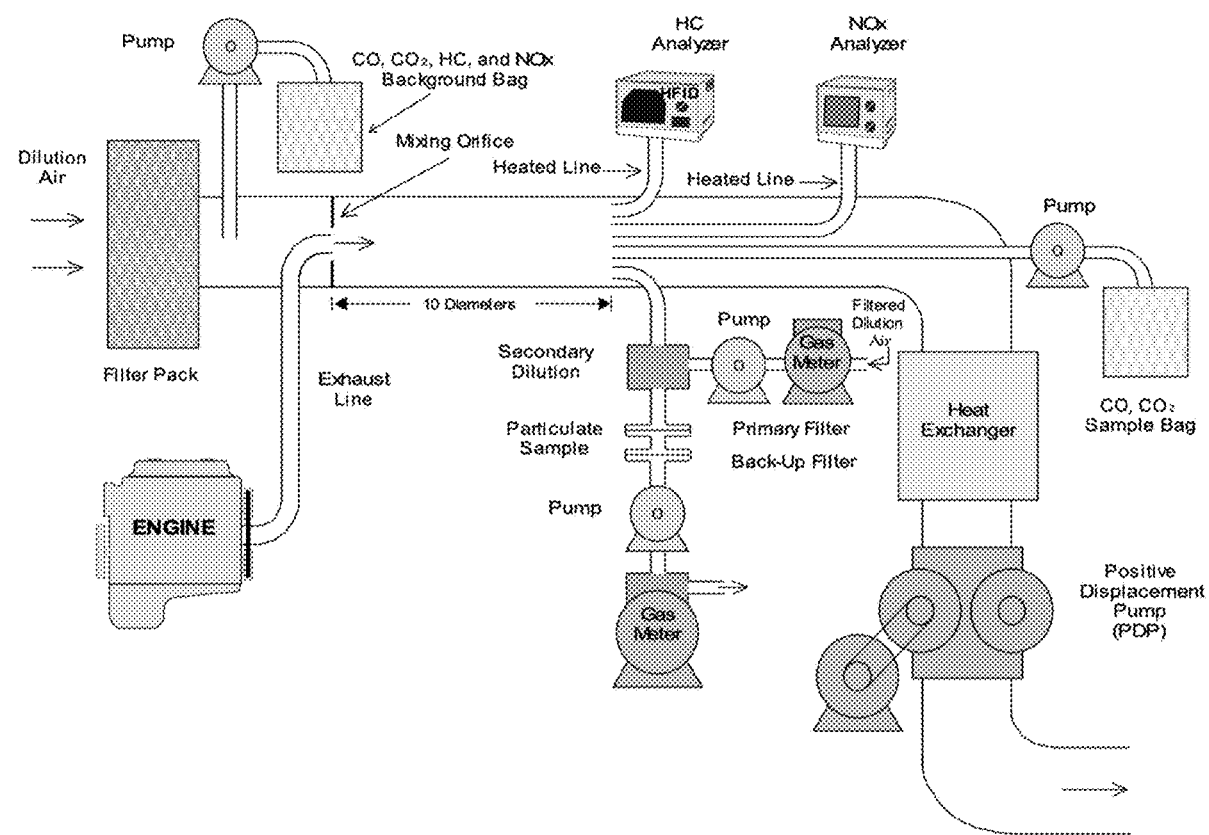
FIG. 2 is a schematic of sampling system used for transient emission measurements.

For emission testing, the exhaust was routed to a full flow constant volume sampler (CVS) that utilized a positive displacement pump (PDP), as illustrated in FIG. 2. Total flow in the tunnel was maintained at a nominal flow rate of about 2000 SCFM. Sample zone probes were connected to the main tunnel. These probes were used to collect samples for total particulate (PM) and for the gaseous emissions: NON, THC, CO, and $CO_2$. The $NO_x$ was analyzed using a chemiluminescent (CL) analyzer, the THC used a flame ionization detector (FID), and CO and $CO_2$ was performed using separate non-dispersive infrared (NDIR) detectors. Probes for background gas measurement were connected downstream of the dilution air filter pack, but upstream of the mixing section. Background concentrations were determined for all emissions, and the tunnel THC background was also determined before and after each test. This engine produced emission results less than or equivalent to the standards for that model year. Table 5 compares the 1991 emission standards, the average reference fuel emission results, and the percent of standard for these tests. The engine did not exceed 110 percent of the applicable emission standards for a 1991 model engine.

TABLE 5

| | Transient Emission, G/HP-HR | | | |
|---|---|---|---|---|
| Test Number | THC | CO | $NO_x$ | PM |
| 1991 Standard | 1.3 | 15.5 | 5.0 | 0.25 |
| Reference Fuel | 0.1 | 2.4 | 4.5 | 0.19 |
| % of Standard | 7 | 16 | 90 | 75 |

Figure 3:
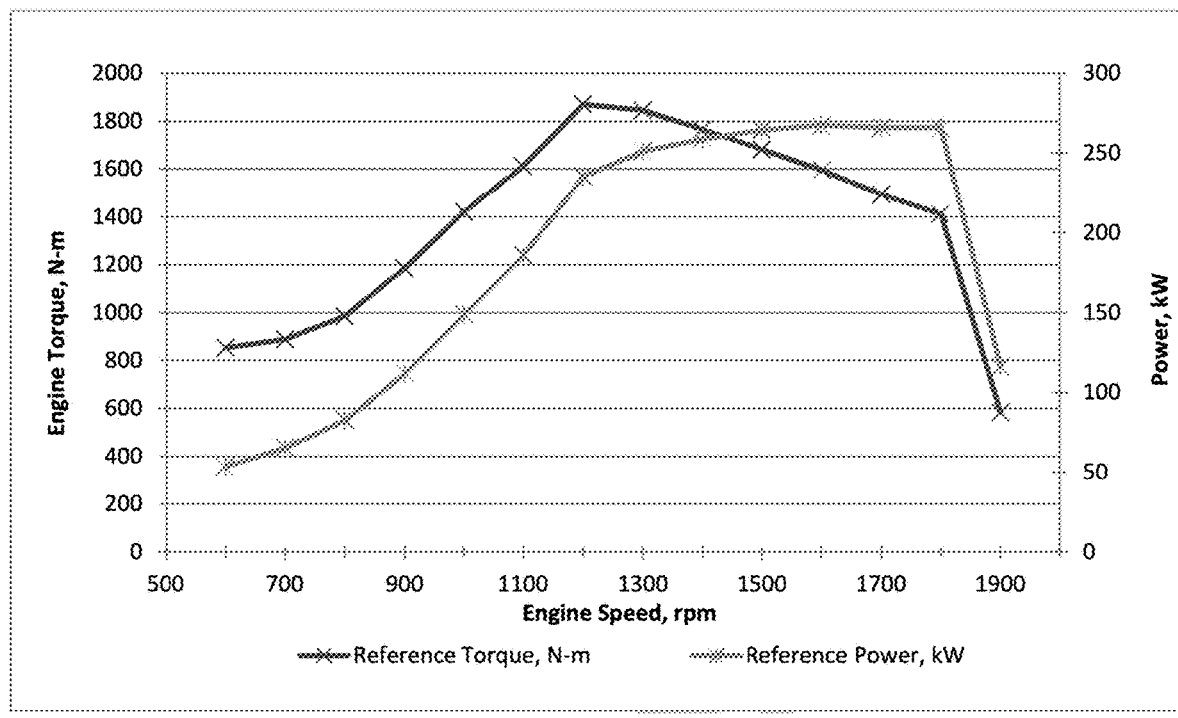
FIG. 3 shows the engine performance maps for screening tests.
Figure 4:
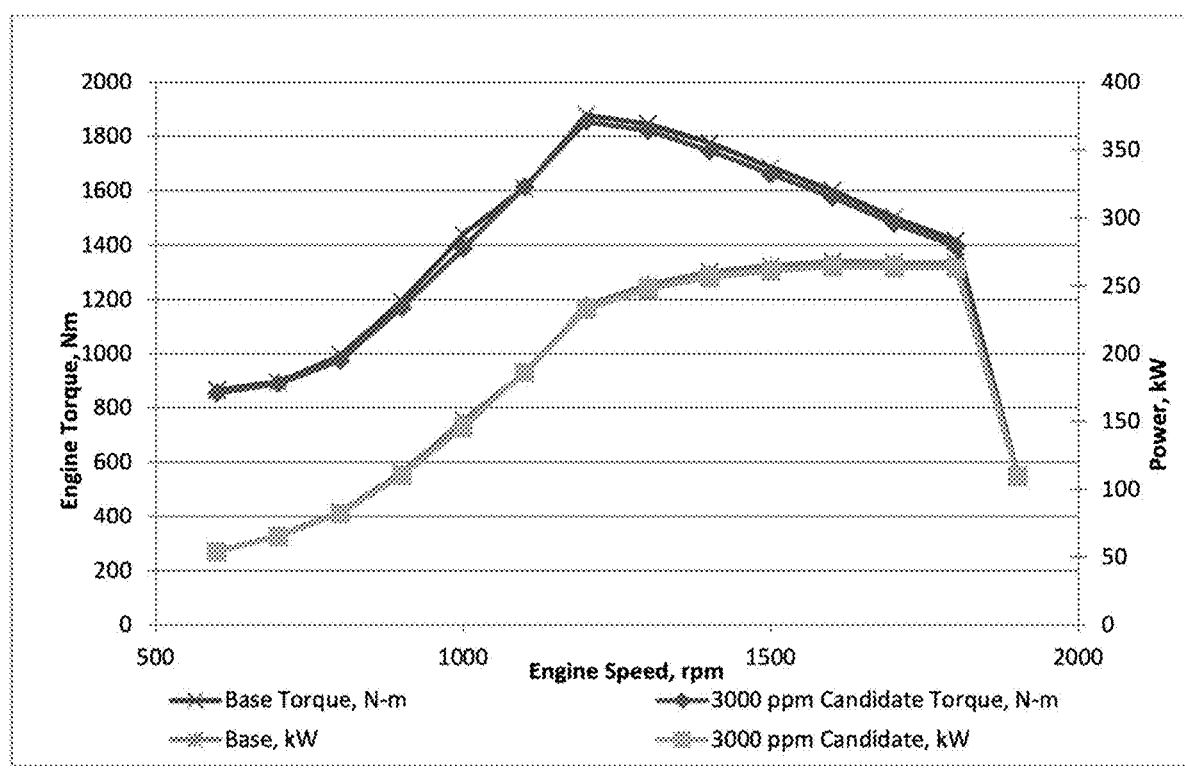
FIG. 4 shows the engine performance maps for screening tests at 3000 ppm additive.
Figure 5:
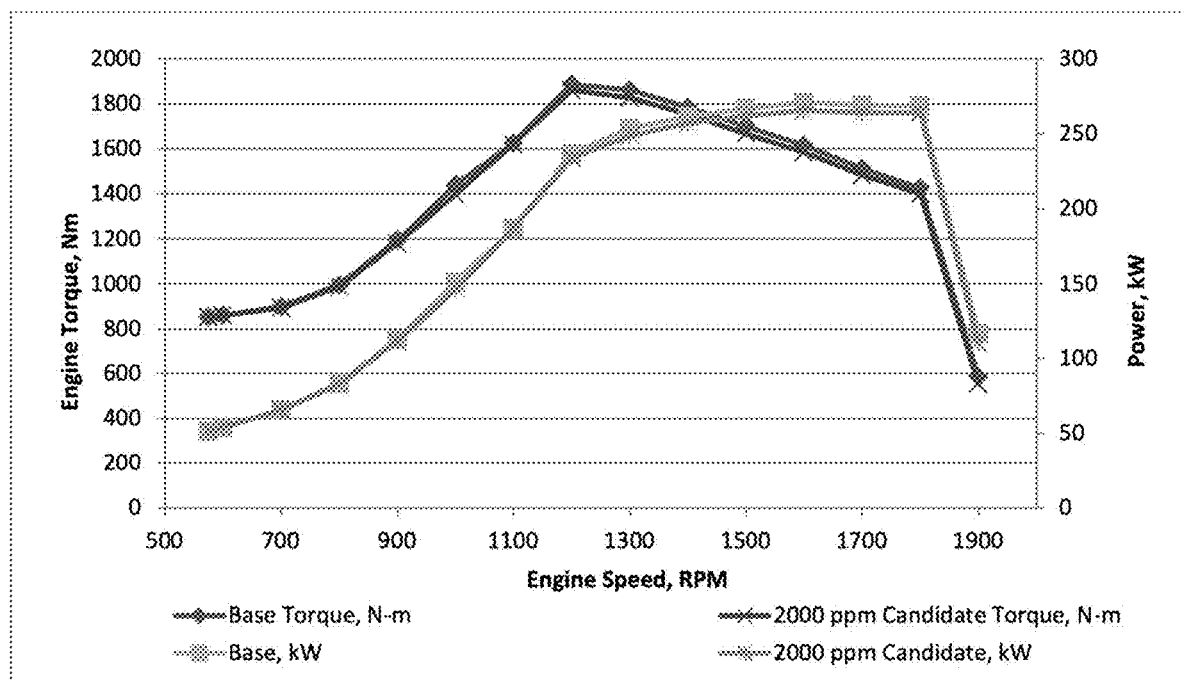
FIG. 5 shows the engine performance maps for screening tests at 2000 ppm additive.
Figure 6:
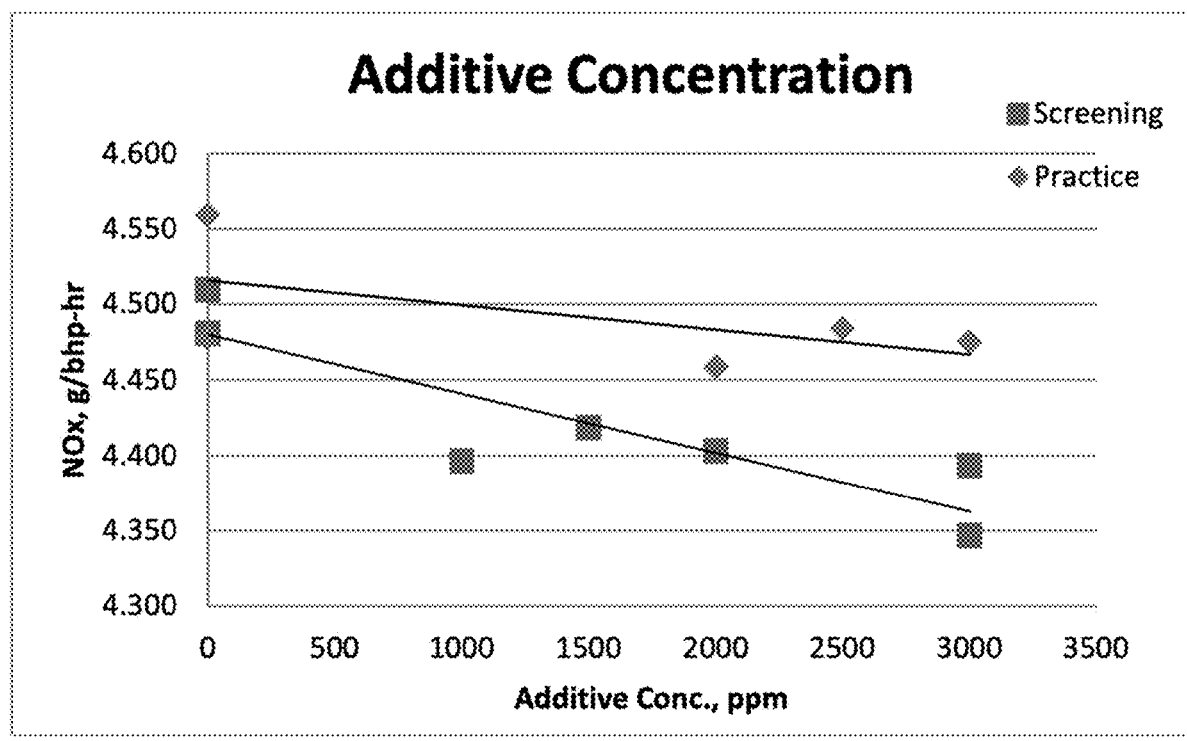
FIG. 6 illustrates additive concentration vs. $NO_x$ results.

FIG. 3 shows a graphical representation of the torque map data for the screening tests, and FIGS. 4 and 5 show the torque map data for the tests with 3000 ppm and 2000 ppm of the additive, respectively. Table 6 gives all of the emission results for THC, CO, $NO_x$, PM, and brake specific fuel consumption (BSFC) obtained for each of the tests. This table groups the tests by fuels and additives rather than in the order that the tests were performed. The average, standard deviation, and coefficient of variation for each set of hot-start transient tests are also included for each fuel. FIG. 6 shows the NOx emissions versus additive concentration with trend lines for a possible shift in baseline.

TABLE 6

| FUEL CODE | RUN # | TRANSIENT EMISSIONS, g/hp-hr | | | | | BSFC, lb/hp-hr | WORK, hp-hr |
|---|---|---|---|---|---|---|---|---|
| | | $CO_2$ | CO | THC | $NO_X$ | PM | | |
| F4 | 1308 | 531.7 | 2.5 | 0.10 | 4.521 | 0.177 | 0.371 | 24.61 |
| | 1309 | 531.4 | 2.5 | 0.10 | 4.501 | 0.194 | 0.371 | 24.60 |
| | 1310 | 531.2 | 2.5 | 0.10 | 4.506 | 0.192 | 0.371 | 24.60 |
| | Average | 531.4 | 2.5 | 0.10 | 4.509 | 0.187 | 0.371 | 24.61 |
| | Std. Dev. | 0.247 | 0.0 | 0.00 | 0.010 | 0.010 | 0.000 | 0.002 |
| F4 | 1340 | 529.7 | 2.5 | 0.09 | 4.475 | 0.189 | 0.370 | 24.60 |
| | 1341 | 530.0 | 2.5 | 0.09 | 4.487 | 0.185 | 0.370 | 24.61 |
| | Average | 529.9 | 2.5 | 0.09 | 4.481 | 0.187 | 0.370 | 24.60 |

TABLE 6-continued

| FUEL CODE | RUN # | TRANSIENT EMISSIONS, g/hp-hr | | | | | BSFC, lb/hp-hr | WORK, hp-hr |
|---|---|---|---|---|---|---|---|---|
| | | CO$_2$ | CO | THC | NO$_X$ | PM | | |
| | Std. Dev. | 0.232 | 0.0 | 0.00 | 0.008 | 0.003 | 0.000 | 0.002 |
| F4 | 1362 | 531.8 | 2.4 | 0.08 | 4.553 | 0.180 | 0.371 | 24.49 |
| | 1363 | 532.8 | 2.4 | 0.08 | 4.560 | 0.180 | 0.371 | 24.49 |
| | 1364 | 533.4 | 2.4 | 0.08 | 4.565 | 0.184 | 0.372 | 24.49 |
| | Average | 532.7 | 2.4 | 0.08 | 4.559 | 0.181 | 0.372 | 24.49 |
| | Std. Dev. | 0.808 | 0.0 | 0.00 | 0.006 | 0.002 | 0.000 | 0.003 |
| F4 | 1370 | 529.4 | 2.5 | 0.09 | 4.463 | 0.184 | 0.370 | 24.69 |
| | 1371 | 529.6 | 2.4 | 0.09 | 4.474 | 0.180 | 0.370 | 24.69 |
| | 1372 | 530.7 | 2.5 | 0.09 | 4.483 | 0.179 | 0.371 | 24.69 |
| | Average | 530.2 | 2.5 | 0.09 | 4.478 | 0.180 | 0.370 | 24.69 |
| | Std. Dev. | 0.759 | 0.1 | 0.00 | 0.006 | 0.001 | 0.001 | 0.001 |
| F5 | 1312 | 532.0 | 2.3 | 0.10 | 4.601 | 0.162 | 0.380 | 24.57 |
| | 1213 | 532.1 | 2.2 | 0.10 | 4.607 | 0.154 | 0.380 | 24.59 |
| | Average | 532.1 | 2.3 | 0.10 | 4.604 | 0.158 | 0.380 | 24.58 |
| | Std. Dev. | 0.086 | 0.1 | 0.00 | 0.004 | 0.005 | 0.000 | 0.011 |
| F5 | 1355 | 531.0 | 2.2 | 0.08 | 4.595 | 0.151 | 0.379 | 24.55 |
| | 1356 | 533.1 | 2.2 | 0.08 | 4.630 | 0.146 | 0.381 | 24.56 |
| | Average | 532.0 | 2.2 | 0.08 | 4.613 | 0.148 | 0.380 | 24.55 |
| | Std. Dev. | 1.476 | 0.0 | 0.00 | 0.025 | 0.003 | 0.001 | 0.01 |
| F6 | 1315 | 532.1 | 2.2 | 0.09 | 4.622 | 0.157 | 0.380 | 24.57 |
| | 1316 | 532.1 | 2.2 | 0.09 | 4.620 | 0.158 | 0.380 | 24.58 |
| | Average | 532.1 | 2.2 | 0.09 | 4.621 | 0.157 | 0.380 | 24.58 |
| | Std. Dev. | 0.026 | 0.0 | 0.00 | 0.001 | 0.001 | 0.000 | 0.008 |
| F7 | 1318 | 531.3 | 2.0 | 0.08 | 4.420 | 0.154 | 0.379 | 24.61 |
| | 1319 | 530.8 | 2.0 | 0.08 | 4.416 | 0.149 | 0.379 | 24.60 |
| | Average | 531.0 | 2.0 | 0.08 | 4.418 | 0.151 | 0.379 | 24.61 |
| | Std. Dev. | 0.350 | 0.0 | 0.00 | 0.003 | 0.004 | 0.000 | 0.004 |
| F9 | 1324 | 526.1 | 2.2 | 0.08 | 4.390 | 0.150 | 0.376 | 24.63 |
| | 1325 | 527.6 | 2.2 | 0.08 | 4.403 | 0.149 | 0.377 | 24.63 |
| | Average | 526.8 | 2.2 | 0.08 | 4.397 | 0.149 | 0.376 | 24.63 |
| | Std. Dev. | 1.080 | 0.0 | 0.00 | 0.009 | 0.000 | 0.001 | 0.00 |
| F11 | 1330 | 529.4 | 2.1 | 0.08 | 4.419 | 0.151 | 0.378 | 24.60 |
| | 1331 | 529.0 | 2.0 | 0.08 | 4.419 | 0.146 | 0.378 | 24.60 |
| | Average | 529.2 | 2.1 | 0.08 | 4.419 | 0.148 | 0.378 | 24.60 |
| | Std. Dev. | 0.291 | 0.1 | 0.00 | 0.000 | 0.004 | 0.000 | 0.004 |
| F10 | 1327 | 529.2 | 2.0 | 0.08 | 4.405 | 0.150 | 0.378 | 24.60 |
| | 1328 | 529.5 | 2.1 | 0.08 | 4.401 | 0.144 | 0.378 | 24.60 |
| | Average | 529.3 | 2.1 | 0.08 | 4.403 | 0.147 | 0.378 | 24.60 |
| | Std. Dev. | 0.206 | 0.1 | 0.00 | 0.002 | 0.004 | 0.000 | 0.004 |
| F10 | 1374 | 533.2 | 2.1 | 0.07 | 4.449 | 0.142 | 0.381 | 24.68 |
| | 1375 | 533.9 | 2.0 | 0.07 | 4.459 | 0.147 | 0.381 | 24.69 |
| | 1376 | 533.7 | 2.1 | 0.07 | 4.459 | 0.149 | 0.381 | 24.70 |
| | Average | 533.6 | 2.1 | 0.07 | 4.455 | 0.146 | 0.381 | 24.69 |
| | Std. Dev. | 0.362 | 0.1 | 0.00 | 0.006 | 0.004 | 0.000 | 0.012 |
| F14 | 1358 | 534.7 | 2.2 | 0.07 | 4.483 | 0.148 | 0.382 | 24.53 |
| | 1359 | 534.5 | 2.1 | 0.07 | 4.485 | 0.146 | 0.382 | 24.55 |
| | Average | 534.6 | 2.1 | 0.07 | 4.484 | 0.147 | 0.382 | 24.54 |
| | Std. Dev. | 0.104 | 0.0 | 0.00 | 0.001 | 0.001 | 0.000 | 0.012 |
| F8 | 1321 | 528.7 | 2.0 | 0.08 | 4.356 | 0.143 | 0.377 | 24.63 |
| | 1322 | 529.9 | 2.0 | 0.08 | 4.337 | 0.143 | 0.375 | 24.64 |
| | Average | 529.3 | 2.0 | 0.08 | 4.347 | 0.143 | 0.376 | 24.64 |
| | Std. Dev. | 0.865 | 0.0 | 0.00 | 0.013 | 0.000 | 0.001 | 0.009 |
| F8 | 1346 | 528.7 | 2.0 | 0.08 | 4.386 | 0.142 | 0.378 | 24.57 |
| | 1347 | 529.9 | 2.0 | 0.07 | 4.402 | 0.143 | 0.378 | 24.56 |
| | Average | 529.3 | 2.0 | 0.08 | 4.394 | 0.142 | 0.378 | 24.56 |
| | Std. Dev. | 0.865 | 0.0 | 0.00 | 0.012 | 0.001 | 0.001 | 0.009 |
| F8 | 1366 | 535.1 | 2.1 | 0.07 | 4.473 | 0.148 | 0.382 | 24.46 |
| | 1367 | 534.8 | 2.0 | 0.07 | 4.480 | 0.147 | 0.382 | 24.47 |
| | 1368 | 534.8 | 2.1 | 0.07 | 4.472 | 0.149 | 0.382 | 24.48 |
| | Average | 534.9 | 2.1 | 0.07 | 4.475 | 0.148 | 0.382 | 24.47 |
| | Std. Dev. | 0.147 | 0.1 | 0.00 | 0.004 | 0.001 | 0.000 | 0.006 |
| F13 | 1349 | 531.7 | 2.0 | 0.07 | 4.409 | 0.150 | 0.380 | 24.54 |
| A2 | 1350 | 532.5 | 2.0 | 0.07 | 4.415 | 0.152 | 0.380 | 24.55 |
| | Average | 532.1 | 2.0 | 0.07 | 4.412 | 0.151 | 0.380 | 24.54 |
| | Std. Dev. | 0.539 | 0.0 | 0.00 | 0.004 | 0.002 | 0.000 | 0.01 |
| F12 | 1352 | 528.0 | 2.1 | 0.07 | 4.389 | 0.152 | 0.377 | 24.58 |
| A2 | 1353 | 529.2 | 2.1 | 0.07 | 4.411 | 0.147 | 0.378 | 24.59 |
| | Average | 528.6 | 2.1 | 0.07 | 4.400 | 0.149 | 0.378 | 24.59 |
| | Std. Dev. | 0.0805 | 0.0 | 0.00 | 0.016 | 0.004 | 0.001 | 0.01 |

Figure 7:
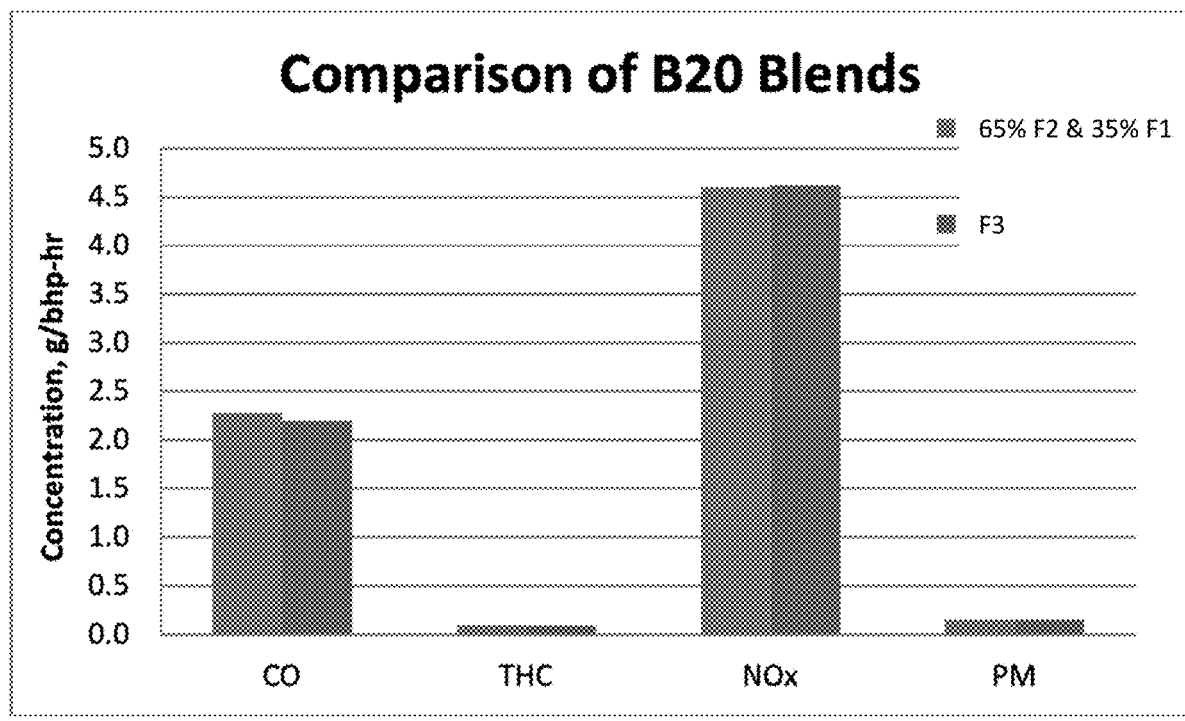
FIG. 7 shows a comparison of B20 blends.

Two different biodiesels were used. F3 was blended at a concentration of 20 percent biodiesel in the base fuel, F4 to make F6. The other B20 (20 percent biodiesel and 80 percent diesel) blend was a combination of F1 at a concentration of 35 percent and F2 at a concentration of 65 percent. See Table 2. The blend of these two biodiesels was then mixed with the base fuel to make a second B20 blend (F5). FIG. 7 compares the emission results for both biodiesels when blended at a concentration of 20 percent biodiesel. F5 produced slightly less $NO_x$ than the single component biodiesel blend.

Figure 8:
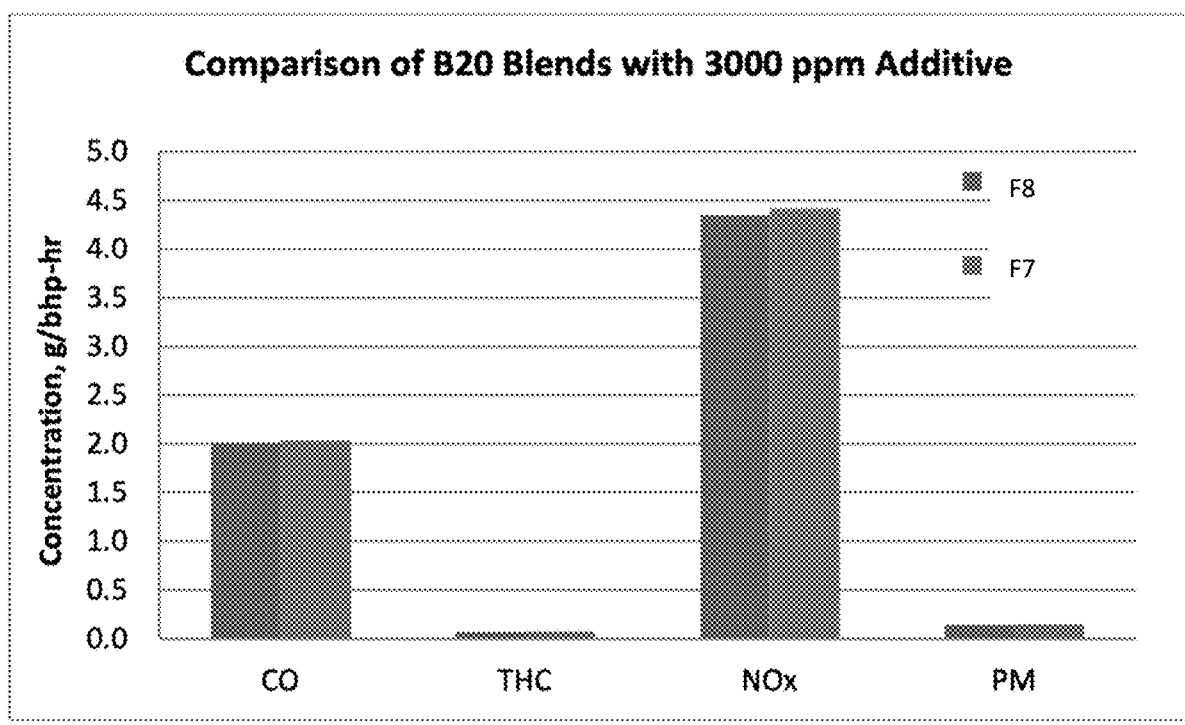
FIG. 8 shows a comparison of B20 blends with 3000 ppm A1

The two B20 blends were then mixed with the additive (A1) at a concentration of 3000 ppm. F8 was the B20 blend with a combination of F1 at a concentration of 35 percent and F2 at a concentration of 65 percent, and F7 was the B20 blend with F6 (See Table 2). FIG. 8 compares the emission results for the two B20 blends with the additive at 3000 ppm. F8 produced slightly less $NO_x$ than the single component biodiesel blend.

Figure 9:
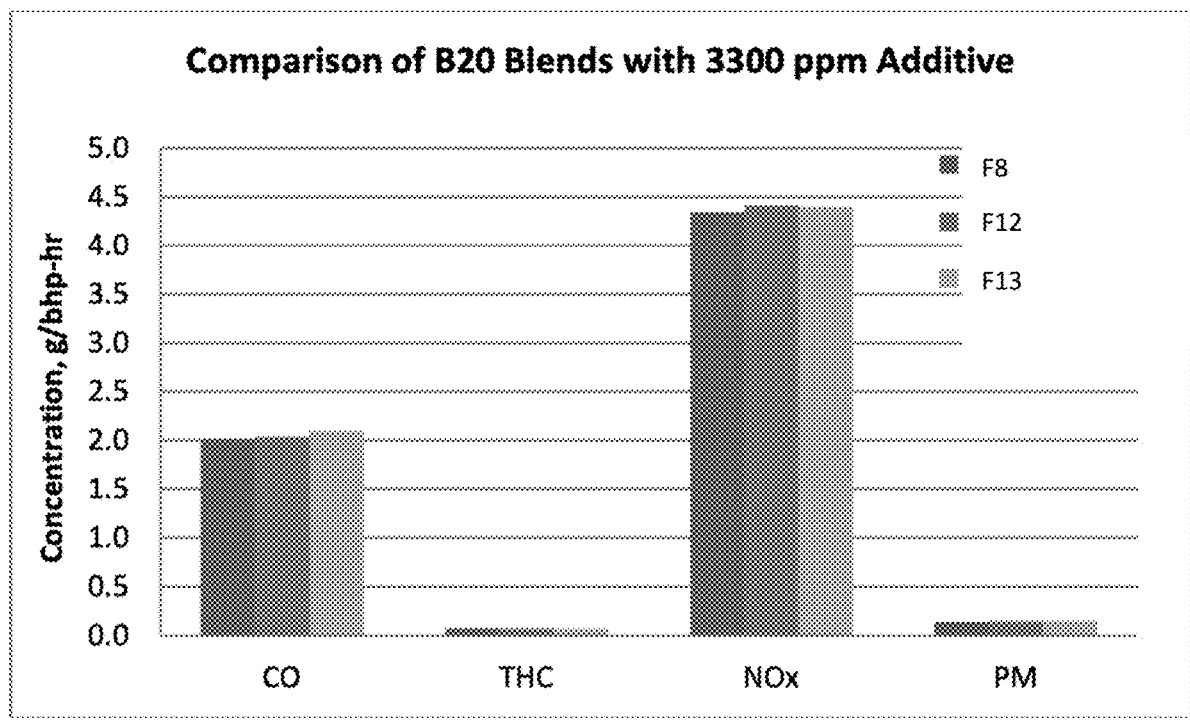
FIG. 9 shows a comparison of B20 blends with 3000 ppm additive.

Two additional additives were blended with F8 at a concentration of 3300 ppm. The two additives were A2 and A3. The fuel codes were F13 and F12, respectively. FIG. 9 compares the emission results for these two additive blends.

Tables 7 and 8 show the statistical approach for comparing the emission results with additive A7 at 3000 ppm and 2000 ppm, respectively. With this approach, the average emissions from the three (3) individual tests with the candidate fuel, Fuel C ($X_c$), were compared to the average emission results for three (3) individual tests with the reference fuel, Fuel R ($X_R$), by using the one-sided t distribution. The average term for the reference fuel for each emission was adjusted by the tolerance, (1 percent of the average for NOx and 2 percent of the average for CO and PM) and by a value that included: tolerance, $\delta$ and pooled standard deviation, $S_p$.

Square root of two divided by the number of tests, n, for both reference plus candidate (in this case, n=14, to represent the potential result if the entire seven day test protocol was performed) One-sided upper percentage point oft distribution with a=0.15 and 2n-2 degrees of freedom. The equation for this comparison is $X_C < X_R + \delta - (S_p \times \sqrt{2}/\eta \times t(a, 2n-2))$. See CCR Title 13, Chapter 5—Standards for Motor Vehicle Fuels, Article 3—Specifications for Alternative Motor Vehicle Fuels. Values presented in Table 7 and 8 were based on a spreadsheet calculation. If the average for the candidate fuel is less than the adjusted average for the reference fuel, then the candidate fuel is comparable or better than the reference fuel.

TABLE 7

| Statistical Criteria | $NO_x$ | CO | PM |
|---|---|---|---|
| Number of Test Points, $n^a$ | 14 | 14 | 14 |
| C Average, $X_c^b$ | 4.475 | 2.081 | 0.148 |
| R Average, $X_R^b$ | 4.559 | 2.364 | 0.181 |
| Tolerance Level, $\delta^c$ | 0.046 | 0.047 | 0.004 |
| Pooled std. Dev., $Sp^b$ | 0.005 | 0.048 | 0.002 |
| Sqrt of 2/n | 0.378 | 0.378 | 0.378 |
| Student's t, $t^d$ | 1.058 | 1.058 | 1.058 |
| Adjusted R Average, Adj. $X_R^{b,e}$ | 4.603 | 2.392 | 0.184 |
| Is $X_c$ < Adj. $X_R$ | Yes | Yes | Yes |
| Percent Reduction, r | 2.8 | 13.0 | 19.7 |

$^a$For alternative 4, n = number of tests (plus reference candidate)
$^b$Units are in g/bhp-hr
$^c$Tolerance level is 1 percent for $NO_x$ and 2 percent for CO and PM
One-sided student's t for 2n − 2 degrees of freedom and significance level of 0.15
Adj. $X_R = X_R + \delta - (S_p \times \sqrt{2}/\eta \times t(a, 2n-2))$ where t(a, 2n − 2) is 1.055

TABLE 8

| Statistical Criteria | $NO_x$ | CO | PM |
|---|---|---|---|
| Number of Test Points, $n^a$ | 14 | 14 | 14 |
| C Average, $X_c^b$ | 4.455 | 2.090 | 0.146 |
| R Average, $X_R^b$ | 4.473 | 2.475 | 0.181 |
| Tolerance Level, $\delta^c$ | 0.045 | 0.050 | 0.004 |
| Pooled std. Dev., $Sp^b$ | 0.008 | 0.072 | 0.003 |
| Sqrt of 2/n | 0.378 | 0.378 | 0.378 |
| Student's t, $t^d$ | 1.058 | 1.058 | 1.058 |
| Adjusted R Average, Adj. $X_R^{b,e}$ | 4.515 | 2.496 | 0.183 |
| Is $X_c$ < Adj. $X_R$ | Yes | Yes | Yes |
| Percent Reduction, r | 1.3 | 16.3 | 20.4 |

$^a$For alternative 4, n = number of tests (plus reference candidate)
$^b$Units are in g/bhp-hr
$^c$Tolerance level is 1 percent for $NO_x$ and 2 percent for CO and PM
One-sided student's t for 2n − 2 degrees of freedom and significance level of 0.15
Adj. $X_R = X_R + \delta - (S_p \times \sqrt{2}/\eta \times t(a, 2n-2))$ where t(a, 2n − 2) is 1.055

F5 was used in a further blend as follows.

120 gallons of F4 base fuel used as the untreated diesel blend stock were transferred into a clean tote. 30 gallons of F5 and 1703 ml of 2-ethylhexyl nitrate fuel additive were added. The fuel was blended for one hour with an air-actuated stirrer, and a sample was taken for analysis. The fuel properties for the candidate fuel blend are shown in Table 9 together with the properties for base fuel F4. For the fatty acid methyl ester (FAME), the analysis showed that the concentration was 19.8 percent by volume. The resulting treated candidate fuel, Fuel C, was then identified as F15.

TABLE 9

| F4 Base Fuel | Value | F15 Candidate Fuel | Value |
|---|---|---|---|
| Sulfur, ppm | 0.9 | Sulfur, ppm | 1.56 |
| Nitrogen, ppm | 1.7 | Nitrogen, ppm | 284.4 |
| Cetane number | 49.3 | Cetane number | 59.1 |
| API Gravity | 35.8 | API Gravity | 34.4 |
| Flash Point, ° F. | 197.5 (91.8) | Flash Point (° C.) | 190 (88) |
| Viscosity @ 40° C., cSt | 3.00 | Viscosity @ 40° C., cSt | 3.14 |
| IBP, ° F. | 400 | IBP, ° F. | 409 |
| 10%, ° F. | 451 | 10%, ° F. | 461 |
| 50%, ° F. | 490 | 50%, ° F. | 521 |
| 90%, ° F. | 592 | 90%, ° F. | 629 |
| EP, F. | 636 | EP, F. | 644 |
| FAME Content, % | — | FAME Content, % | 19.8 |

Fuel tests were performed utilizing Alternative 3 outlined above and in outlined in Title 13 California Code of Regulations Section 2882. Table 10 provides the testing protocol that was used. F4 is referred to as "Fuel R" for Reference Fuel and F15 is referred to as "Fuel C" for Candidate Fuel.

TABLE 10

| Step | Description |
|---|---|
| 1 | Install engine. Perform emission instrument calibrations as required. Calibrate torquemeter and check signal conditioning systems. Validate CVS gaseous and particulate sampling systems using propane recovery techniques |
| 2 | Check engine condition using in-house, low sulfur emissions type fuel, and note fault codes if any. Bring engine oil level to "full". |
| 3 | Perform fuel change procedure to operate on Fuel R (F4). Change filter, purge fuel supply, etc. |
| 4 | Warm up engine, and operate at rated speed and load, then check performance. |
| 5 | Conduct transient "full-throttle" torque map from low- to high-idle. Compute and store resulting transient command cycle. |
| 6 | Load dummy sample media, and run a 20-minute practice or conditioning transient cycles, and adjust dynamometer controls to meet statistical limits for transient cycle operation |

TABLE 10-continued

| Step | Description |
|---|---|
| 7 | Soak the engine for 20-minutes. Run three hot-start transient tests with a 20-minute soak between each. For each individual hot-start test, determine THC, CO, $NO_x$, $CO_2$, and PM. |
| 8 | Perform fuel change, and repeat Steps 3 through 7 with Fuel C. |
| 9 | On Day 2 of testing, repeat Steps 4 through 9 starting with Fuel C and ending with Fuel R. |
| 10 | On Day 3 of testing, repeat Steps 4 through 9 starting with Fuel R and ending with Fuel C. |
| 11 | On Day 4 of testing, repeat Steps 4 through 9 starting with Fuel C and ending with Fuel R |
| 12 | On Day 5 of testing, repeat Steps 4 through 9 starting with Fuel R and ending with Fuel C. |
| 13 | On Day 6 of testing, repeat Steps 4 through 9 starting with Fuel C and ending with Fuel R. |
| 14 | On Day 7 of testing, repeat Steps 4 through 9 starting with Fuel R and ending with Fuel C. |
| 15 | Summarize data and prepare the final report. |

Table 11 gives the emission results for HC, CO, $NO_x$, PM, and brake specific fuel consumption (BSFC) obtained for each of the tests. The average for each set of triplicate hot start transient tests was also included for each fuel.

TABLE 11

| TEST NUMBER | TRANSIENT EMISSIONS, g/hp-hr | | | | | BSFC, lb/hp-hr | WORK, hp-hr |
|---|---|---|---|---|---|---|---|
| | $CO_2$ | THC | CO | $NO_X$ | PM | | |
| R1 | 538.0 | 2.437 | 0.077 | 4.621 | 0.183 | 0.378 | 24.39 |
| R2 | 538.1 | 2.432 | 0.081 | 4.620 | 0.182 | 0.378 | 24.39 |
| R3 | 539.1 | 2.530 | 0.083 | 4.620 | 0.182 | 0.378 | 24.39 |
| Average | 538.4 | 2.466 | 0.080 | 4.621 | 0.183 | 0.378 | 24.39 |
| C4 | 539.6 | 2.122 | 0.075 | 4.540 | 0.147 | 0.388 | 24.35 |
| C5 | 540.4 | 2.026 | 0.071 | 4.538 | 0.146 | 0.389 | 24.35 |
| C6 | 540.3 | 2.026 | 0.071 | 4.542 | 0.148 | 0.389 | 24.36 |
| Average | 540.1 | 2.058 | 0.072 | 4.540 | 0.147 | 0.388 | 24.35 |
| C7 | 539.0 | 2.121 | 0.070 | 4.513 | 0.148 | 0.388 | 24.39 |
| C8 | 539.9 | 2.061 | 0.066 | 4.512 | 0.149 | 0.388 | 24.38 |
| C9 | 539.5 | 1.997 | 0.070 | 4.523 | 0.149 | 0.388 | 24.38 |
| Average | 539.5 | 2.060 | 0.069 | 4.516 | 0.149 | 0.388 | 24.38 |
| R10 | 539.7 | 2.485 | 0.085 | 4.597 | 0.188 | 0.379 | 24.39 |
| R11 | 539.9 | 2.551 | 0.086 | 4.600 | 0.188 | 0.379 | 24.38 |
| R12 | 539.6 | 2.469 | 0.087 | 4.615 | 0.190 | 0.379 | 24.40 |
| Average | 539.7 | 2.502 | 0.086 | 4.604 | 0.189 | 0.379 | 24.39 |
| R13 | 537.1 | 2.543 | 0.078 | 4.567 | 0.183 | 0.377 | 24.41 |
| R14 | 538.0 | 2.462 | 0.079 | 4.568 | 0.185 | 0.378 | 24.43 |
| R15 | 538.1 | 2.438 | 0.081 | 4.584 | 0.184 | 0.378 | 24.42 |
| Average | 537.7 | 2.481 | 0.079 | 4.573 | 0.184 | 0.377 | 24.42 |
| C16 | 539.2 | 2.035 | 0.068 | 4.513 | 0.146 | 0.388 | 24.36 |
| C17 | 538.9 | 2.059 | 0.071 | 4.514 | 0.149 | 0.388 | 24.35 |
| C18 | 539.9 | 2.143 | 0.073 | 4.526 | 0.148 | 0.388 | 24.35 |
| Average | 539.3 | 2.079 | 0.071 | 4.518 | 0.148 | 0.388 | 24.35 |
| C19 | 532.1 | 2.045 | 0.064 | 4.432 | 0.129 | 0.383 | 24.40 |
| C20 | 532.9 | 2.026 | 0.067 | 4.436 | 0.144 | 0.383 | 24.40 |
| C21 | 532.9 | 2.029 | 0.069 | 4.447 | 0.148 | 0.383 | 24.38 |
| Average | 532.7 | 2.033 | 0.067 | 4.438 | 0.141 | 0.383 | 24.39 |
| R22 | 534.6 | 2.558 | 0.082 | 4.553 | 0.182 | 0.375 | 24.38 |
| R23 | 535.3 | 2.558 | 0.085 | 4.561 | 0.190 | 0.376 | 24.38 |
| R24 | 535.7 | 2.496 | 0.087 | 4.564 | 0.186 | 0.376 | 24.39 |
| Average | 535.2 | 2.537 | 0.085 | 4.559 | 0.186 | 0.376 | 24.38 |
| R25 | 528.2 | 2.485 | 0.077 | 4.482 | 0.187 | 0.371 | 24.48 |
| R26 | 529.0 | 2.564 | 0.080 | 4.493 | 0.187 | 0.371 | 24.48 |
| R27 | 529.3 | 2.475 | 0.082 | 4.502 | 0.190 | 0.372 | 24.48 |
| Average | 528.8 | 2.508 | 0.080 | 4.492 | 0.188 | 0.371 | 24.48 |
| C28 | 532.9 | 2.155 | 0.066 | 4.437 | 0.151 | 0.383 | 24.37 |
| C29 | 532.9 | 2.088 | 0.066 | 4.440 | 0.152 | 0.383 | 24.37 |
| C30 | 534.0 | 2.207 | 0.068 | 4.447 | 0.151 | 0.384 | 24.37 |
| Average | 533.3 | 2.150 | 0.067 | 4.441 | 0.151 | 0.384 | 24.37 |

Table 12 shows the statistical approach for comparing the emission results. With this approach, the average for each of the triplicate results from the 21 individual tests with the candidate fuel, Fuel C (Xc), were compared to the average for each of the triplicate results for 21 individual tests with the average reference fuel, Fuel R (XR), by using the calculations describe above with $X_C < X_R + \delta - (S_p \times \sqrt{2}/\eta \times t(a, 2n-2))$.

TABLE 12

| Statistical Criteria | HC | CO | $NO_x$ | PM |
|---|---|---|---|---|
| Number of Test Points, $n^a$ | 14 | 14 | 14 | 14 |
| C Average, $X_c^b$ | 0.082 | 2.509 | 4.540 | 0.187 |
| R Average, $X_R^b$ | 0.068 | 2.080 | 4.463 | 0.147 |
| Tolerance Level, $\delta^c$ | 0.002 | 0.050 | 0.045 | 0.004 |
| Pooled std. Dev., $Sp^b$ | 0.003 | 0.033 | 0.065 | 0.003 |
| Sqrt of 2/n | 26 | 26 | 26 | 26 |
| Student's t, $t^d$ | 1.058 | 1.058 | 1.058 | 1.058 |
| Adjusted R Average, Adj. $X_R^{b,e}$ | 0.082 | 2.546 | 4.560 | 0.189 |
| Is $X_c$ < Adj. $X_R$ | Yes | Yes | Yes | Yes |
| Percent Reduction, r | 17.5 | 18.3 | 2.1 | 22.1 |

$^a$For alternative 1, n = number of tests (plus reference candidate)
$^b$Units are in g/bhp-hr
$^c$Tolerance level is 1 percent for $NO_x$ and 2 percent for HC, CO, and PM
$^d$df = 2(n − 1)
One-sided student's t for 2n − 2 degrees of freedom and significance level of 0.15
Adj. $X_R = X_R + \delta - (S_p \times \sqrt{2}/\eta \times t(a, 2n-2))$ where $t(a, 2n-2)$ is 1.055

As shown, the candidate fuel was found to decrease the $NO_x$ emissions by 2.1 percent when compared to the reference fuel. The PM emissions were decreased by about 22 percent and average HC and CO were lower (17.5 and 18.3 percent lower, respectively).

The contents of all references (including literature references, issued patents, published patent applications, and co-pending patent applications) cited throughout this application are hereby expressly incorporated herein in their entireties by reference. Unless otherwise defined, all technical and scientific terms used herein are accorded the meaning commonly known to one with ordinary skill in the art.

What is claimed is:

1. A biodiesel fuel mixture composition comprising:
    18-21 wt. % of biodiesel, the biodiesel having:
        a cetane number of 47 or greater;
        a sulfur content of 15 ppm or less;
        a flash point of 190° F. or greater; and
        a fatty acid methyl ether (FAME) content of 95 volume % or greater; and
    79-82 wt. % of a base petroleum diesel fuel, the base petroleum diesel fuel having:
        between 10 wt % and 25 wt % aromatics;
        7 wt % polycyclic aromatics or less;
        a cetane number between 45 and 60;
        a sulfur content of 15 ppm or less;
        a flash point of 125° F. or greater; and
        a FAME content of 5 volume % or less; and
    from 1000 to 3500 ppm 2-ethylhexyl nitrate.

2. The biofuel mixture of claim 1, wherein the biodiesel fuel mixture decreases NOx emissions of an engine by 1 to 7%.

3. The biofuel mixture of claim 1, wherein the biodiesel fuel mixture decreases total particulate matter emissions of an engine by 20 to 25%.

4. The biofuel mixture of claim 1, wherein the biodiesel fuel mixture decreases CO emissions of an engine by 15 to 25%.

5. The biofuel mixture of claim 1, wherein the biodiesel fuel mixture decreases total hydrocarbon emissions of an engine by 15 to 25%.

6. The biofuel mixture of claim 1, wherein the biodiesel fuel mixture has a cetane number of 45 to 70.

7. The biodiesel fuel mixture of claim 6, wherein the biodiesel fuel mixture has a cetane number of 45 to 65.

8. The biofuel mixture of claim 1, wherein the biodiesel fuel mixture comprises 2-20% aromatics by volume.

9. The biodiesel fuel mixture of claim 1, wherein the biodiesel fuel mixture comprises less than 7% polycyclic aromatics by weight.

10. The biodiesel fuel mixture of claim 9, wherein the biodiesel fuel mixture comprises 0.2-5% polycyclic aromatics by weight.

11. The biofuel mixture of claim 1, wherein the biodiesel fuel includes 12-15 wt. % of a first biodiesel fuel and 6-8 wt. % of a second biodiesel fuel.

12. The biodiesel fuel mixture of claim 11, comprising:
13 wt. % of the first biodiesel fuel;
7 wt. % of the second biodiesel fuel; and
80 wt. % of the base petroleum diesel fuel.

13. The biodiesel fuel mixture of claim 1, wherein a fatty acid methyl ester content of the biodiesel fuel mixture is 19 to 21 wt. %.

14. The biodiesel fuel mixture of claim 1, wherein a viscosity of the biodiesel fuel mixture at 40° C. is 1.9 to 4.1 centistokes.

15. The biodiesel fuel mixture of claim 1, wherein the 2-ethylhexyl nitrate is present in an amount of 1000, 1500, 2000, 2500, 3000, or 3300 ppm.

16. The biodiesel fuel mixture of claim 15, wherein the 2-ethylhexyl nitrate is present in an amount of 3300 ppm or 3000 ppm.

17. A biodiesel fuel mixture composition comprising:
15-25 wt. % of biodiesel, the biodiesel having:
a cetane number of 47 or greater;
a sulfur content of 15 ppm or less;
a flash point of 190° F. or greater; and
a fatty acid methyl ether (FAME) content of 95 volume % or greater; and
75-85 wt. % of a base petroleum diesel fuel, the base petroleum diesel fuel having:
between 10 wt % and 25 wt % aromatics;
7 wt % polycyclic aromatics or less;
a cetane number between 45 and 60;
a sulfur content of 15 ppm or less;
a flash point of 125° F. or greater; and
a FAME content of 5 volume % or less; and
from 1000 to 3500 ppm 2-ethylhexyl nitrate.

18. The biodiesel fuel mixture of claim 17, further comprising about 300 ppm di-tert-butyl peroxide and about 300 ppm phenylenediamine.

19. The biodiesel fuel mixture of claim 17, wherein an increase in 2-ethylhexyl nitrate concentration results in a decrease in the NOx emissions of an engine.

* * * * *

UNITED STATES PATENT AND TRADEMARK OFFICE
CERTIFICATE OF CORRECTION

PATENT NO. : 11,518,950 B2
APPLICATION NO. : 17/510836
DATED : December 6, 2022
INVENTOR(S) : Patrick McDuff It is certified that error appears in the above-identified patent and that said Letters Patent is hereby corrected as shown below:

In the Specification

Column 11, Line 30, delete "oft" and insert -- of t --.

Signed and Sealed this
Tenth Day of January, 2023

Katherine Kelly Vidal
*Director of the United States Patent and Trademark Office*